US010259381B2

(12) United States Patent
Oh et al.

(10) Patent No.: US 10,259,381 B2
(45) Date of Patent: Apr. 16, 2019

(54) LED LIGHT BAR COVER WITH AUTO SHUT OFF LIGHT SWITCH

(71) Applicants: Kwang J. Oh, La Crescenta, CA (US); Heidi Oh, La Crescenta, CA (US); Loren Oh, Irvine, CA (US); Austin Oh, Azusa, CA (US)

(72) Inventors: Kwang J. Oh, La Crescenta, CA (US); Heidi Oh, La Crescenta, CA (US); Loren Oh, Irvine, CA (US); Austin Oh, Azusa, CA (US)

( * ) Notice: Subject to any disclaimer, the term of this patent is extended or adjusted under 35 U.S.C. 154(b) by 172 days.

(21) Appl. No.: 15/448,370

(22) Filed: Mar. 2, 2017

(65) Prior Publication Data

US 2017/0254509 A1    Sep. 7, 2017

Related U.S. Application Data

(60) Provisional application No. 62/304,919, filed on Mar. 7, 2016, provisional application No. 62/308,130, filed on Mar. 14, 2016, provisional application No. 62/312,738, filed on Mar. 24, 2016, provisional application No. 62/364,710, filed on Jul. 20, 2016, provisional application No. 62/369,725, filed on Aug. 1, 2016, provisional application No. 62/430,856, filed on Dec. 6, 2016, provisional application No. 62/435,059, filed on Dec. 15, 2016.

(51) Int. Cl.
*B60Q 1/00* (2006.01)
*B60Q 1/05* (2006.01)
*B60Q 1/24* (2006.01)
*F21Y 103/10* (2016.01)
*F21Y 115/10* (2016.01)

(52) U.S. Cl.
CPC ............ *B60Q 1/24* (2013.01); *B60Q 1/0005* (2013.01); *B60Q 1/05* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS

2009/0256697 A1* 10/2009 Tallinger ............. B60Q 1/2611
340/472

OTHER PUBLICATIONS

Trux Catalog, vol. 10, pp. 87-90, Mar. 30, 2018, (Year: 2018).*
(Continued)

*Primary Examiner* — Britt D Hanley
(74) *Attorney, Agent, or Firm* — John K. Park; Park Law Firm

(57) ABSTRACT

An LED light bar is provided, comprising an LED light bar body, a cover, and a light shut-off switch. The cover has a closing surface portion and a rear surface portion and is connected to the LED light bar body through hinges at the two side portions for closing and opening the first LED lights on the front portion, and the cover has at least two stable deploying positions including a closing position and an opening position. The light shut-off switch is provided on the first portion of the LED light bar body for turning off the first LED lights while the cover is in the closing position. The LED light bar may further comprise second LED lights disposed on the closing surface portion of the cover, and the light shut-off switch is further configured for turning off the second LED lights while the cover is in the closing position.

15 Claims, 22 Drawing Sheets

(56) References Cited

OTHER PUBLICATIONS

Trux Youtube Video (https://www.youtube.com/watch?v=J35mjjTqLts), Published Sep. 22, 2017, (Year: 2017).*

* cited by examiner

LED LIGHT BAR COVER WITH AUTO SHUT OFF LIGHT SWITCH

RELATED APPLICATION

This application is a Non-provisional application of Provisional Application Ser. No. 62/304,919 for "Curved Side Hinge LED Light Bar Cover" filed on 7 Mar. 2016, 62/308,130 for "LED Light Bar Cover for Vehicular LED Light Bar" filed on 14 Mar. 2016, 62/312,738 for "LED Light Bar with Flip Cover" filed on 24 Mar. 2016, 62/364,710 for "Dual Flood and Spot LED Light Bar with Side Hinge Cover" filed on 20 Jul. 2016, 62/369,725 for "Dual Flood and Spot LED Light Bar with Side Hinge Bar" filed on 1 Aug. 2016, 62/430,856 for "LED Light Bar Cover with Auto Shut Off Light Switch" filed on 6 Dec. 2016, and 62/435,059 for "LED Light Bar with Solar Panel and Charger for Cover Flood Light" filed on 15 Dec. 2016".

BACKGROUND OF THE INVENTION

The present invention relates to an LED light bar cover.

There are many shapes of LED light bars in the market and most comes in either straight line or curved lined shape.

A common issue of the light bar is the length of the light-bar itself. In order to attach the cover to the light bar, a person is required to exit the vehicle with the vehicle (not in motion) in order to manually remove or attach the entire cover of light-bar which can result in injury or damages to either the driver or the vehicle itself. And he/she needs to exit from the car and go around right and left side of the car to attach or remove the cover from the light bar.

Another problem is the case of when a standard cover is not securely attached to the light bar—this can result in serious damages to not only the vehicle but create a hazardous situation for the driver and other drivers on the road, when the cover is not safely mounted to the light bar and driven in high speed, the cover can slip out and fly away from the light bar that can be hazard to other drivers around.

Another problem is when the cover is removed from light-bar, the face of the light bar is constantly exposed to dust, scratches and heat of the sun that can shorten the life of light bar.

Accordingly, a need for an LED light bar cover with auto shut off light switch has been present for a long time considering the expansive demands in the everyday life. This invention is directed to solve these problems and satisfy the long-felt need.

SUMMARY OF THE INVENTION

The present invention contrives to solve the disadvantages of the prior art.

An object of the invention is to provide a LED light bar with a cover.

An aspect of the invention provides an LED light bar comprising an LED light bar body, a cover, and a light shut-off switch.

The LED light bar body having a front portion, a top portion, a bottom portion, a rear portion, and two side portions are disposed on the front portion.

The cover has a closing surface portion and a rear surface portion and is connected to the LED light bar body through hinges at the two side portions and configured for closing and opening the plurality of first LED lights on the front portion, and the cover has at least two stable deploying positions including a closing position and an opening position.

The light shut-off switch is provided on the first portion of the LED light bar body and configured for turning off the plurality of first LED lights while the cover is in the closing position.

At least some of the plurality of first LED lights may comprise LED spot lights, beams of which being directed substantially horizontally.

The LED light bar may further comprise a plurality of second LED lights disposed on the closing surface portion of the cover, wherein the light shut-off switch is further configured for turning off the plurality of second LED lights while the cover is in the closing position.

The plurality of second LED lights may comprise LED flood lights.

The beams from the plurality of second LED lights may be directed obliquely and forwards when the cover is in the opening position.

The light shut-off switch may be configured to be pushed by the closing surface portion of the cover and turns off the plurality of first and second LED lights.

The cover may further comprise two hinge arms extending from the two side portions of the cover.

The LED light bar may further comprise a solar panel installed on the top portion of the LED light bar body and be configured for supplying a back-up power to the plurality of first and second LED lights.

The LED light bar may further comprise a back-up battery configured for being charged with the back-up power from the solar panel.

The back-up battery may be installed in the cover.

The plurality of first LED lights and the plurality of second LED lights may be controlled to turn on independently from each other.

The light shut-off switch may protrude from the front portion of the LED light bar body and be configured to be pushed and turned off by the cover when the cover is closed.

The LED light bar may further comprising a right-side handle hole provided on the right side portion of the cover and a left-side handle hole provided on the left side portion of the cover. Each of the right-side and left-side handle holes may be configured to grab by a user's hand and open or close the cover.

The LED light bar may further comprise one or more rubber pads that are installed on the closing surface portion of the cover around the plurality of second LED lights and configured for blocking dust from outside and damping rattling and bumping of the cover.

The LED light bar may further comprising one or more rubber pads that are installed on the front portion of the LED light bar body around the plurality of first LED lights and configured for blocking dust from outside and damping rattling and bumping of the cover.

The advantages of the present invention are: (1) The LED light bar according to the invention includes a cover that can be used to turn off the LED light when the cover is closed; and (2) the LED light bar according to the invention can be backed up with a solar panel disposed on the LED light bar body.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

Figure 1:
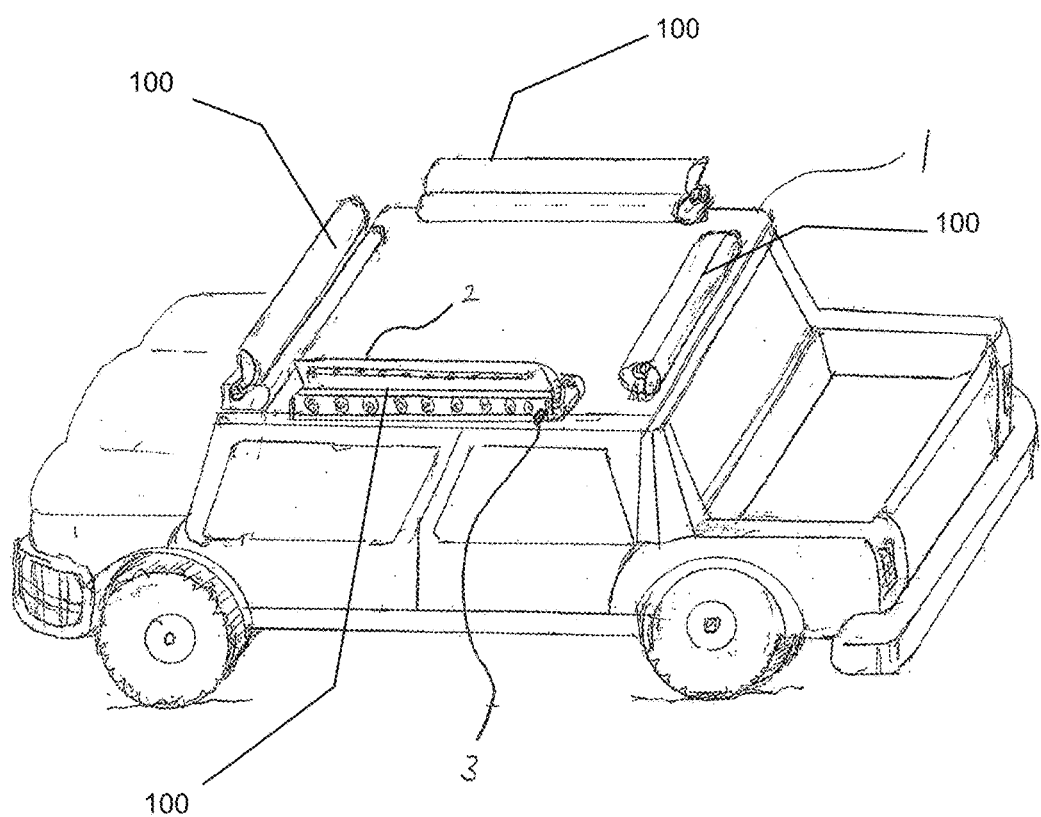
FIG. 1 is a perspective view of an LED light bar cover installed in a vehicle according to an embodiment of the invention.
Figure 2:
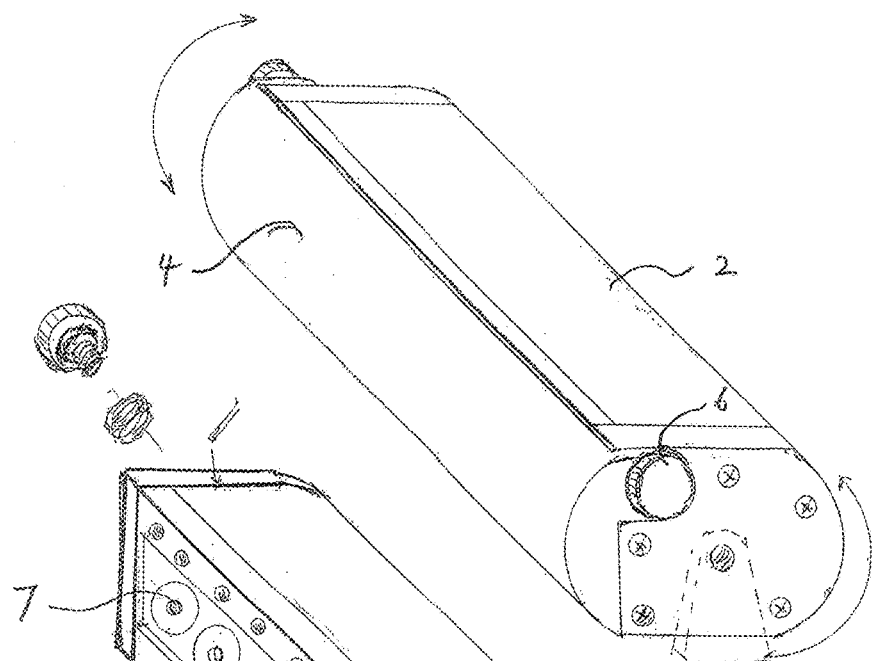
FIG. 2 is a perspective view of an assembled LED light bar cover according to an embodiment of the invention.
Figure 3:
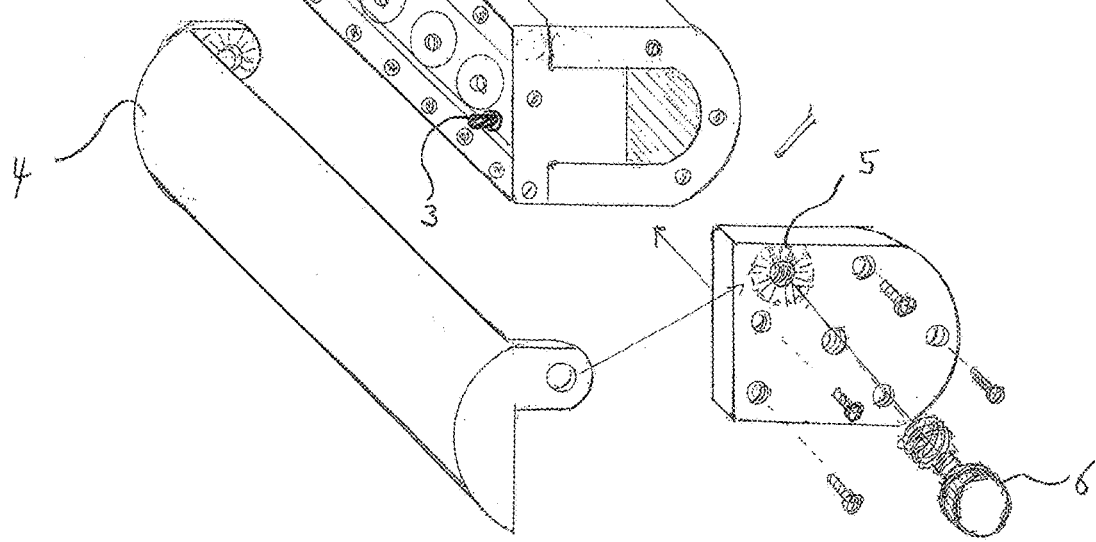
FIG. 3 is a perspective view of an exploded LED light bar cover according to an embodiment of the invention.
Figure 4:
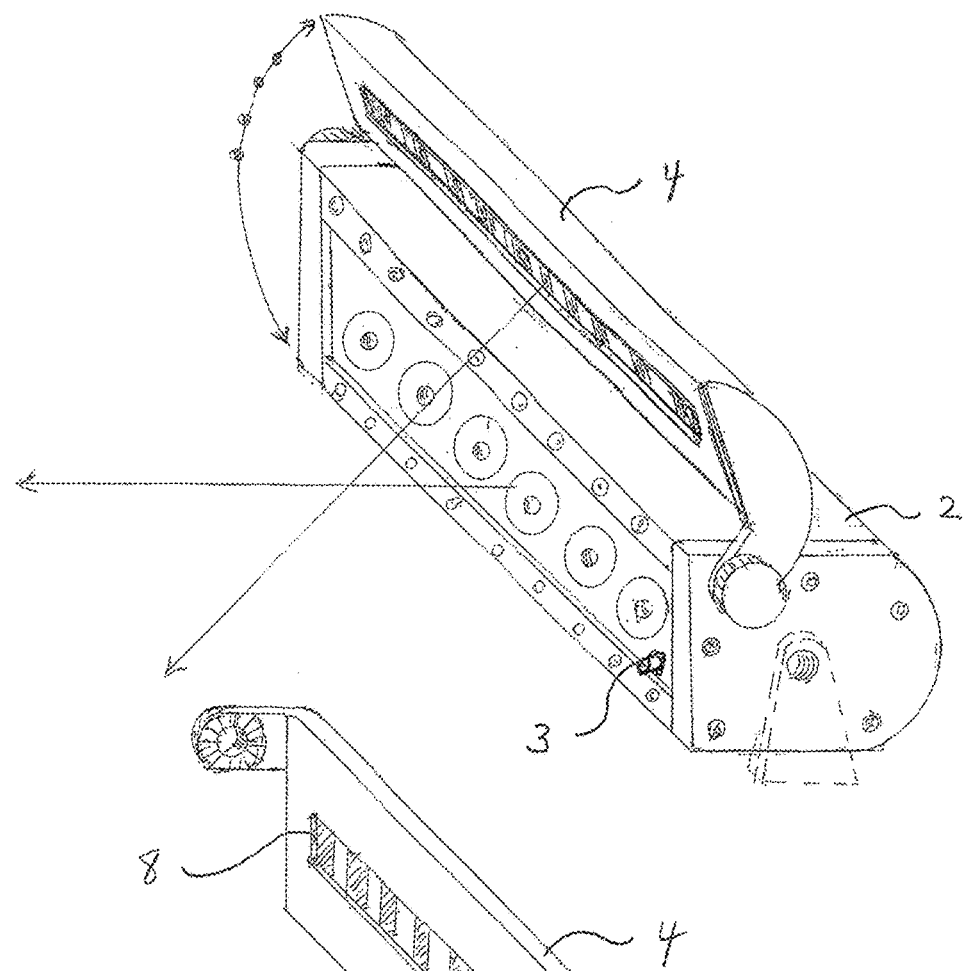
FIG. 4 is a perspective view of a shut off switch with an LED light bar cover according to an embodiment of the invention.

The U.S. Provisional Patent Application No. 62/304,919 for "Curved Side Hinge LED Light Bar Cover" filed on 7 Mar. 2016, 62/308,130 for "LED Light Bar Cover for Vehicular LED Light Bar" filed on 14 Mar. 2016, 62/312,738 for "LED Light Bar with Flip Cover" filed on 24 Mar. 2016, 62/364,710 for "Dual Flood and Spot LED Light Bar with Side Hinge Cover" filed on 20 Jul. 2016, 62/369,725 for "Dual Flood and Spot LED Light Bar with Side Hinge Bar" filed on 1 Aug. 2016, 62/430,856 for "LED Light Bar Cover with Auto Shut Off Light Switch" filed on 6 Dec. 2016, and 62/435,059 for "LED Light Bar with Solar Panel and Charger for Cover Flood Light" filed on 15 Dec. 2016" are incorporated by reference herein for any and all purposes.

Referring to the figures, the embodiments of the invention are described in detail.

Another issue that can be addressed is the amount of power you get out of the direction of the light bar—the light bar may lose significant amounts of illuminating power if completely exposed without proper casing.

Another issue is when the light bar is attached and secure with attached cover, the driver can sometimes might accidently leave the light on while it is covered which can waste the consumption of the energy.

As for technicalities, something that may be of bother to a driver would be the physical space in which the cover for the light bar is stowed. Once removed, the standard light bar cover must be placed within the vehicle if the driver needs to place it back on when needed. This creates significant issues regarding space and maneuverability when it comes to owners who need the extra space.

Another issue is when the cover is removed from light bar, it will take extra space to place it inside the car.

In view of the above, there is a need for cover of the light bar that:

1. is able to be easily opened and closed the cover without completely removing the cover from the body of LED light bar;

2. is easy to open and securely hold while it is opened and easy to close and securely hold while it is closed;

3. will provide safety from the risk of failing to mount the cover onto the light bar;

4. is both convenient for access and also increases the protection of the face of light bar from dust, scratch and heat;

5. will turn off the LED light bar power automatically when it is closed with the cover;

6. removes unnecessary storage space inside the car for travel with the light-bar cover.

Solutions:

According to an aspect of the invention, as shown in FIGS. 1 to 6, advantages of present invention is to provide an easy flip-cover for the light bar (100) for a vehicle (1), which only requires a simple tightening of knob (6) for opening and closing of the LED light bar cover (4).

Still another advantage of the invention is to provide an auto shut off pressed button (3) on the body (2) of the LED light bar (100) so when the cover (4) is closed, it will pressed the shut off button (3) of the LED light (7, 8).

Still another advantage of the invention is provision of increased safety by reducing the risk of mounting failure of cover to the light bar that can create hazard flying object to other drivers in high speed roads. The cover of the light bar does not need to be removed and reattached from the light bar as it is securely attached with the hinge while being securely fastened at all the times utilizing the strength of the magnetic hold. For extra and sure-fire security, a feature suing a road hook connecting the handle of the light-bar to the holder-ring (located on the rear-side of the light-bar) locks the cover to the light-bar in case of even more extreme conditions. This gives the driver an even stronger sense of security in regards to worrying about the security of the placement of the cover.

This ensures that even in conditions of high speed and strong wind, the cover will securely be attached to the main body of the light bar.

Still another advantage (the main function) of the invention is to provide protection of device by adding fast and simple way of covering the face of the light bar, it will protect the face of the light bar from damages of dust, scratches, and long exposure to high daylight heat.

Still another advantage of the present inventions ultimately provides extra cargo space by avoiding the need to take the cover part to store inside the car. This is particularly troublesome for most light-bar covers are made out of non-collapsible or malleable material which is longitudinally challenging for storage within a vehicle.

As shown in FIGS. 7 to 10, another aspect of the invention provides an LED light bar (100) with solar panel (10) and charger for cover flood light. The issue is when the car battery dies down and the cell phone battery dies down, there is extra back up power needed to recharge phone and lighting in night time.

There is another need for cover (4) of the light bar (100) that is able to provide extra back up battery (9) power in off-road, when car battery dies down and no one is able to help, there is in need of extra back up power source.

The advantage of the invention is when the person drives in off-road alone and in the case of an event when no one is able to help when the car battery dies down, this solar panel with charged battery on led light bar cover with flood light can be used as an emergency back up power. Battery will be continually charged during the day and thus it can be used during also night time for lights or other power source without using extra power source from car battery. It can be always recharged during the day and used it during day or night whenever it is in need of usage. Because it is using solar power charged backup power, it will not drain the car battery.

As shown in FIGS. 11 to 23, still another aspect of the invention provides an LED light bar (100) with solar panel (105) and charger.

The LED light bar (100) comprises an LED light bar body (108), a cover (101), and a light shut-off switch (110).

The LED light bar body (108) having a front portion, a top portion, a bottom portion, a rear portion, and two side portions are disposed on the front portion.

Figure 11:
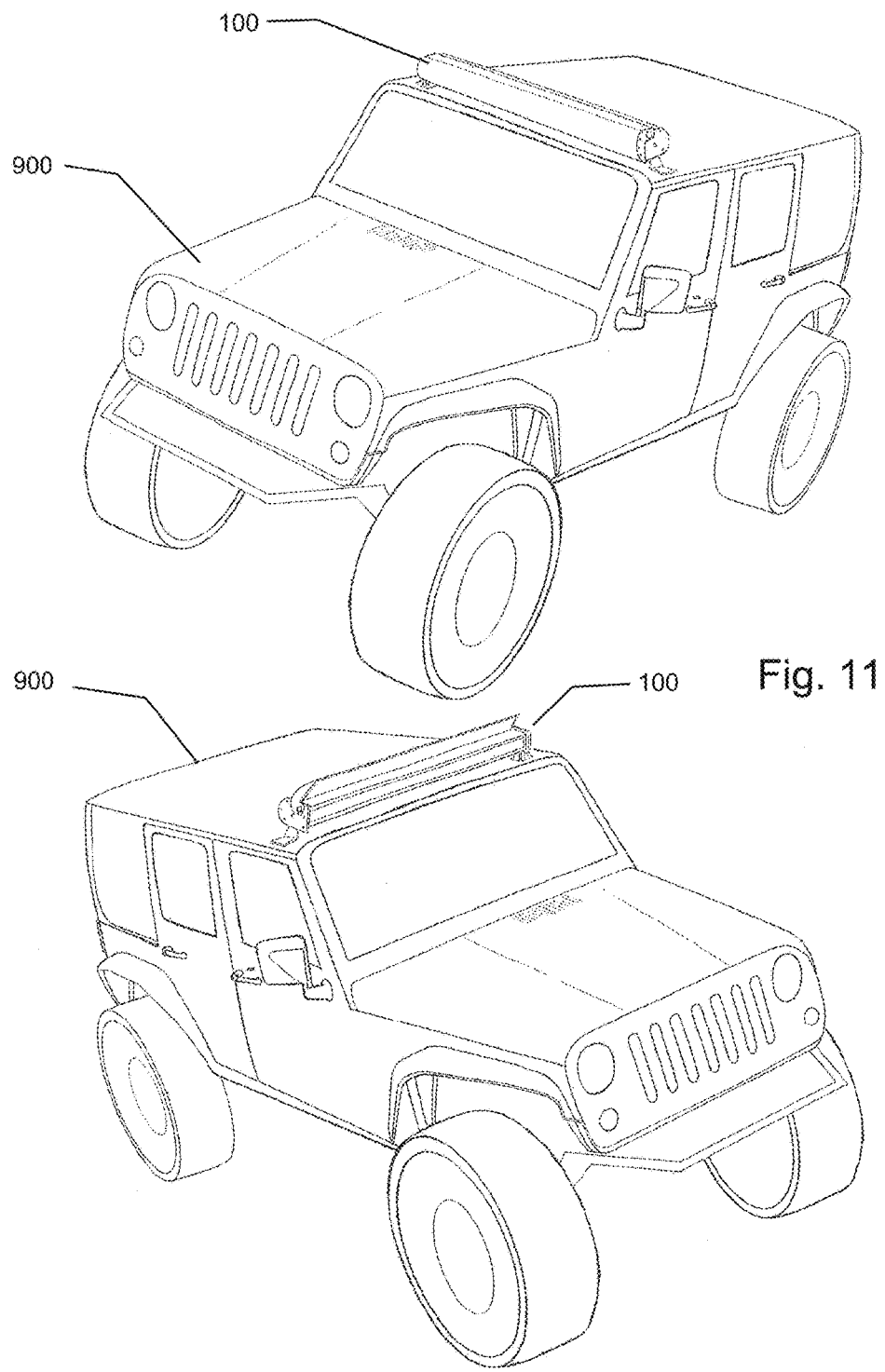
FIG. 11 is a perspective view of LED LIGHT BAR WITH COVER installed in vehicle according to an embodiment of the invention.
Figure 12:
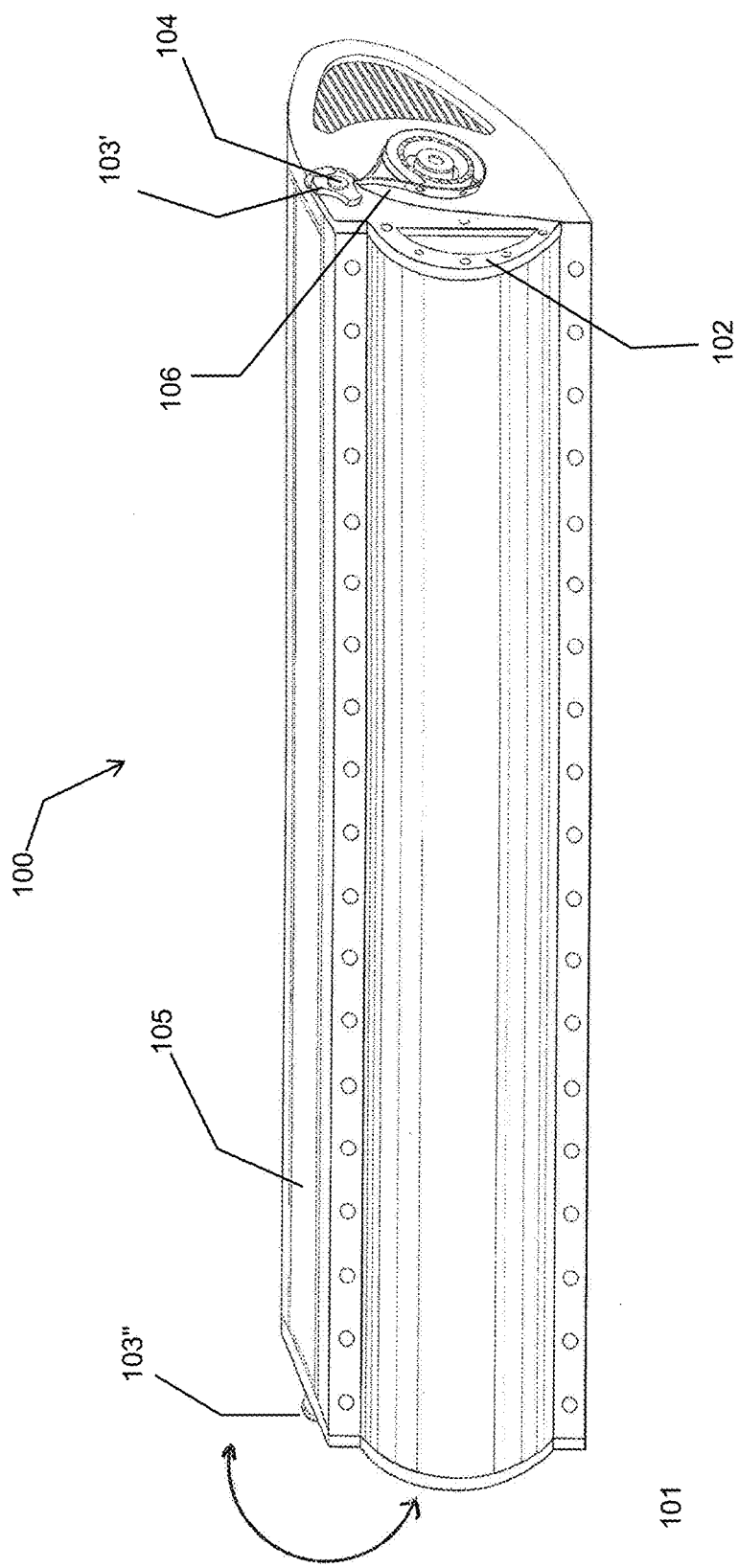
FIG. 12 is a perspective view of LED LIGHT BAR COVER WITH COVER according an embodiment of the invention.
Figure 13:
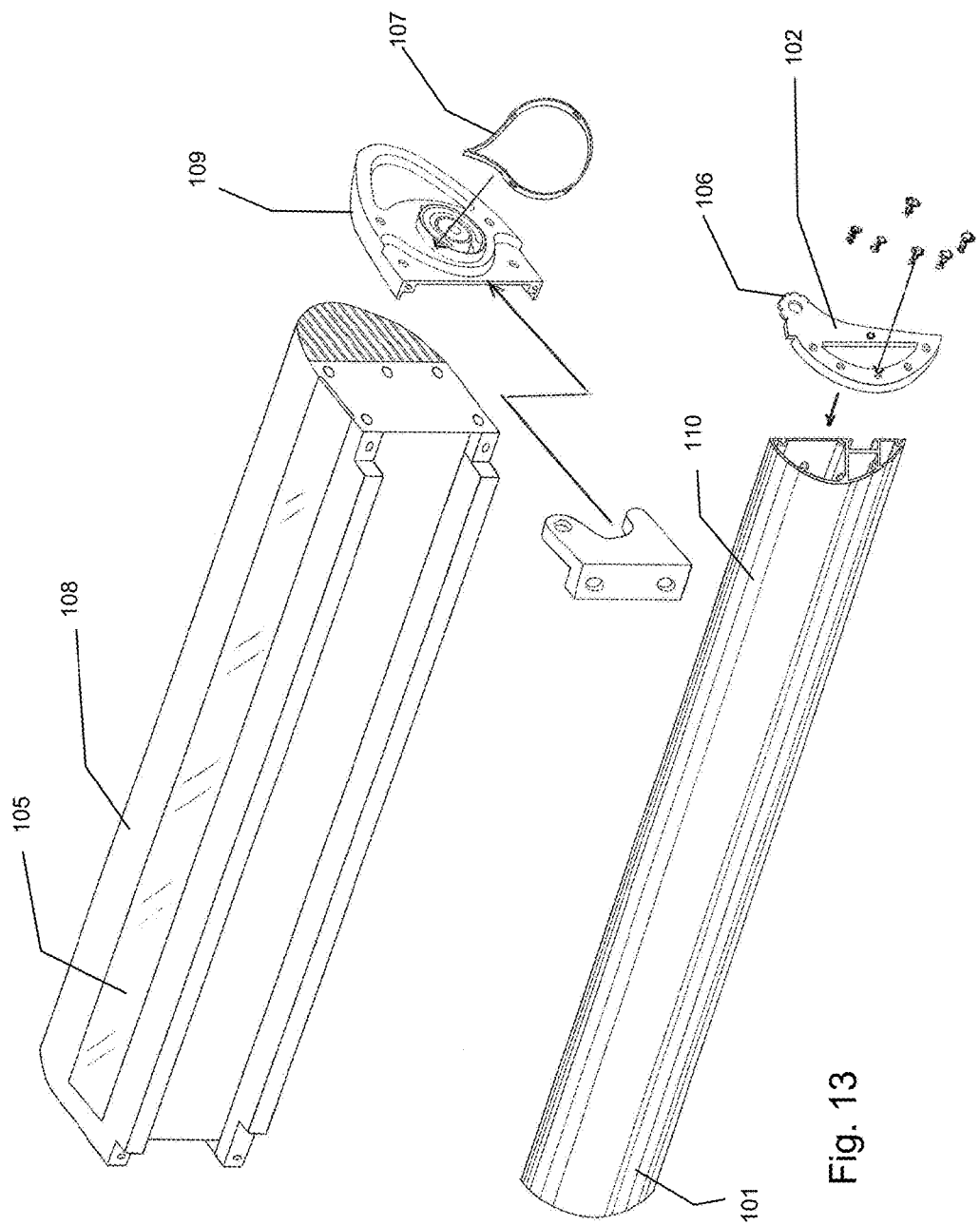
FIG. 13 is a perspective view of exploded LED LIGHT BAR WITH COVER according to an embodiment of the invention.
Figure 14:
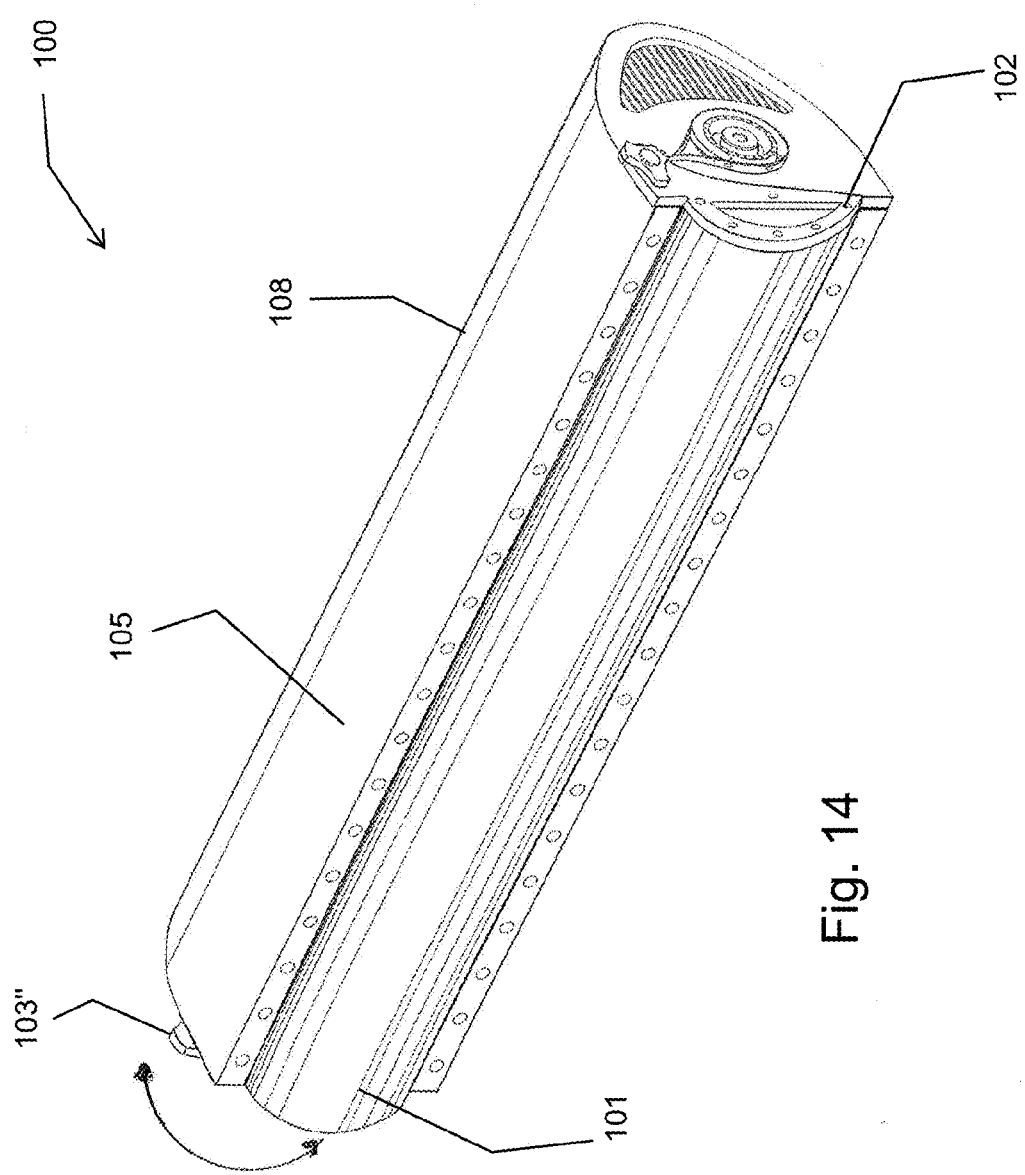
FIG. 14 is a perspective view at LED LIGHT BAR COVER WITH COVER AND SOLAR PANEL according to an embodiment of the invention.
Figure 15:
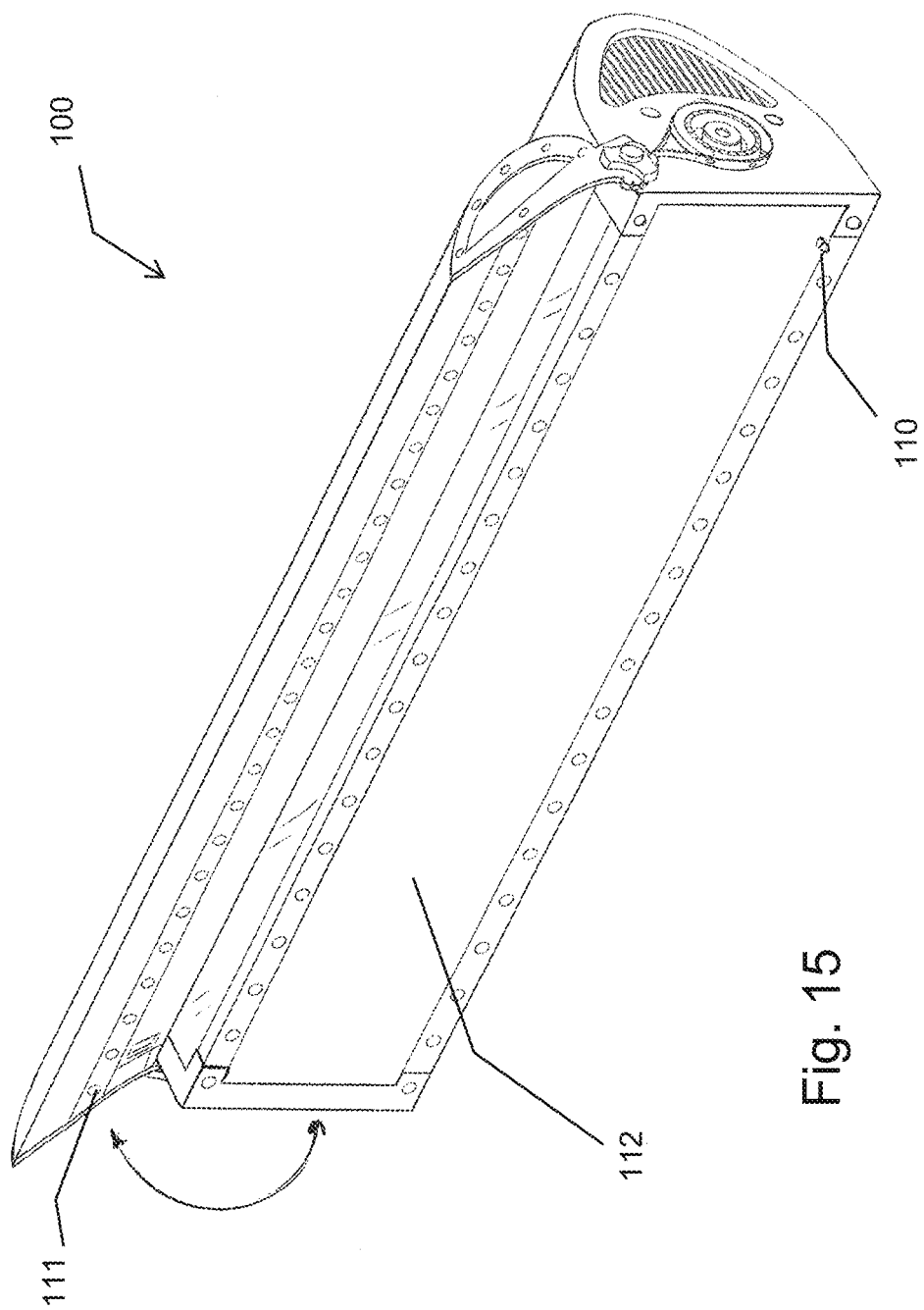
FIG. 15 is perspective view of OPENED LED LIGHT BAR COVER according to an embodiment of the invention.
Figure 16:
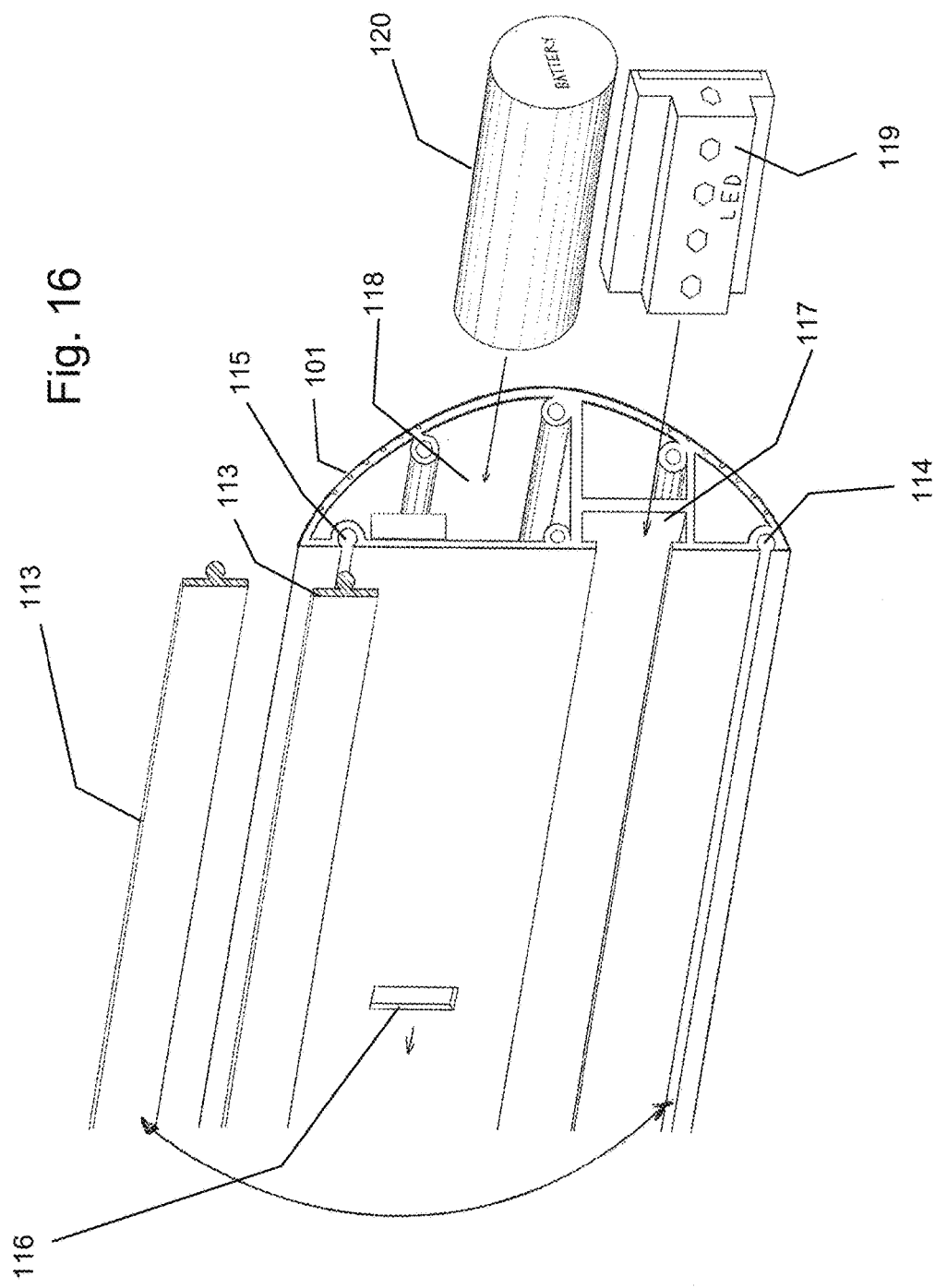
FIG. 16 is perspective view of COVER OF THE LED LIGHT BAR COVER according to an embodiment of the invention.
Figure 17:
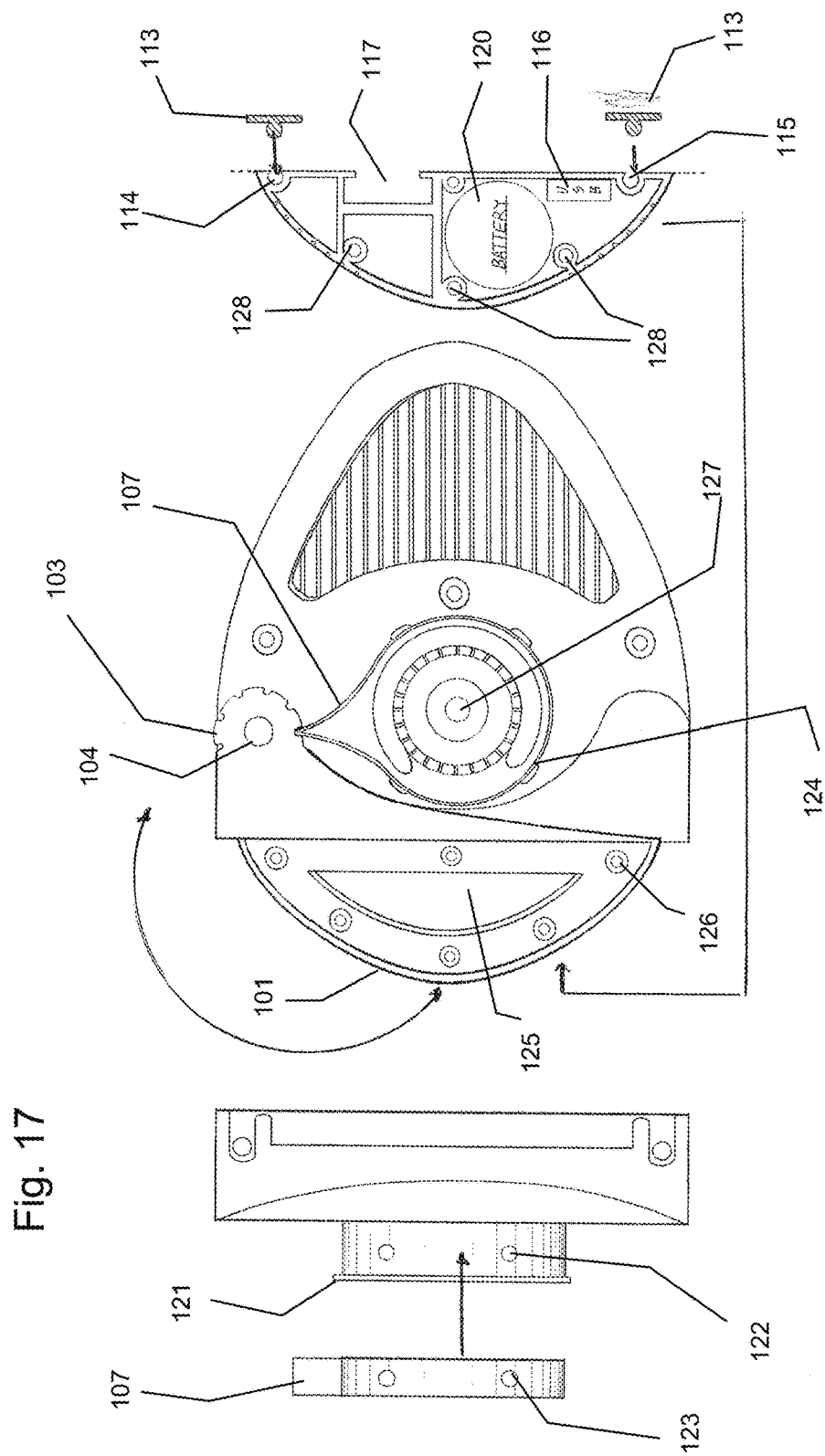
FIG. 17 is a side view of LED LIGHT BAR WITH COVER according to an embodiment of the invention.
Figure 18:
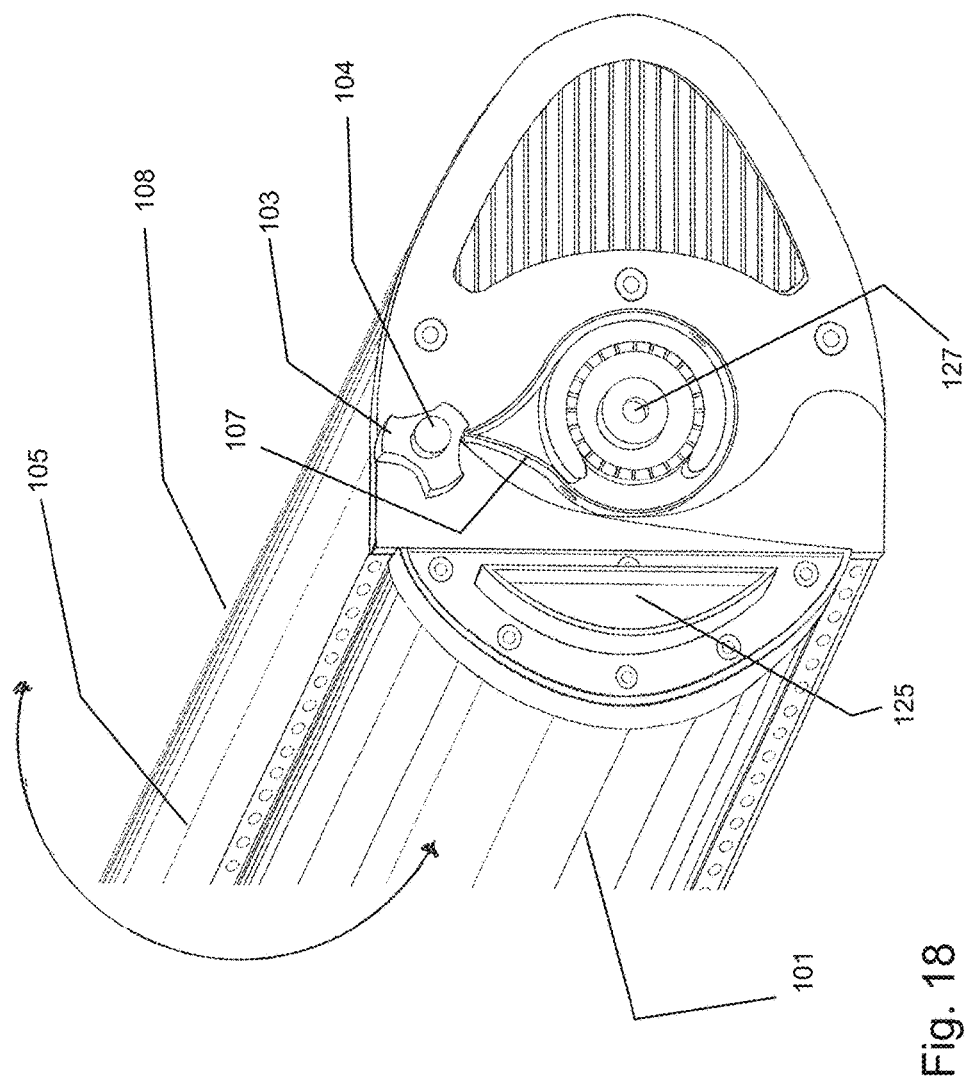
FIG. 18 is a perspective view of LED LIGHT BAR WITH COVER according to an embodiment of the invention.
Figure 19:
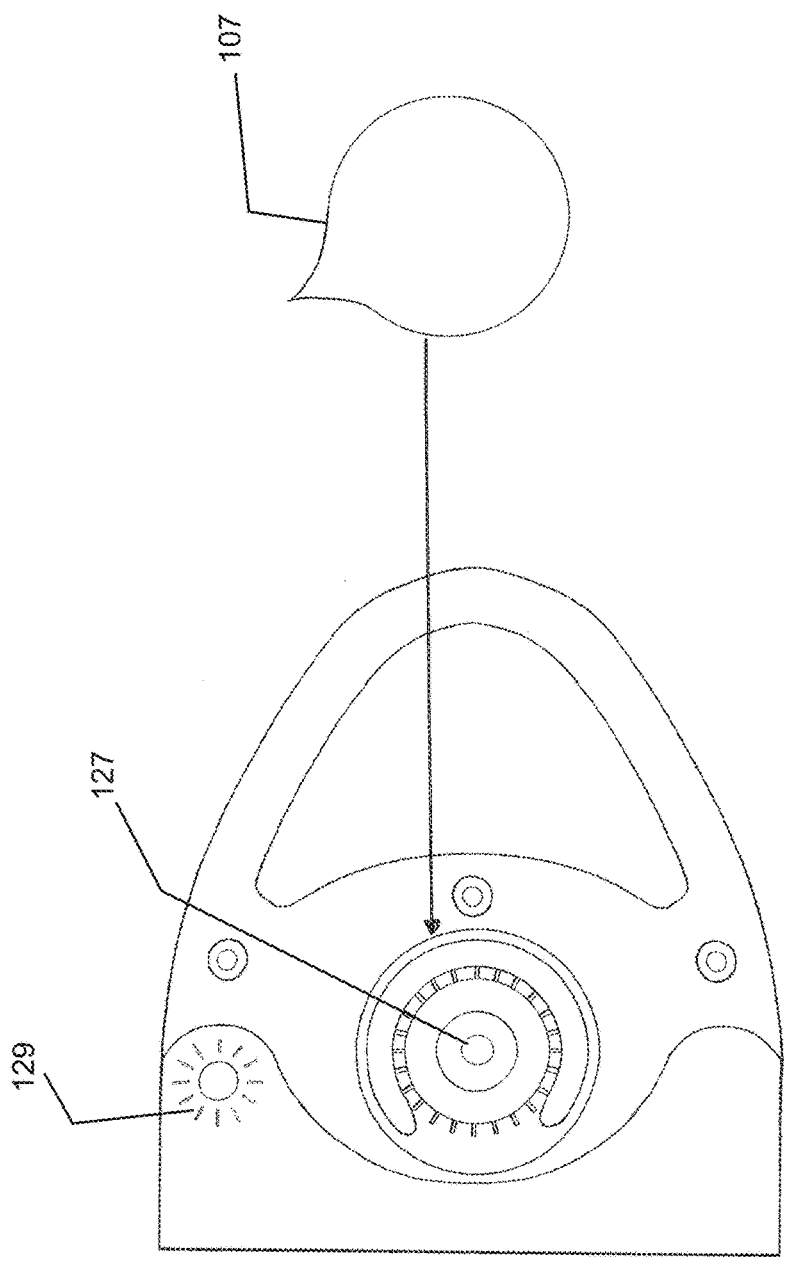
FIG. 19 is a side view of LED LIGHT BAR according to an embodiment of the invention.
Figure 20:
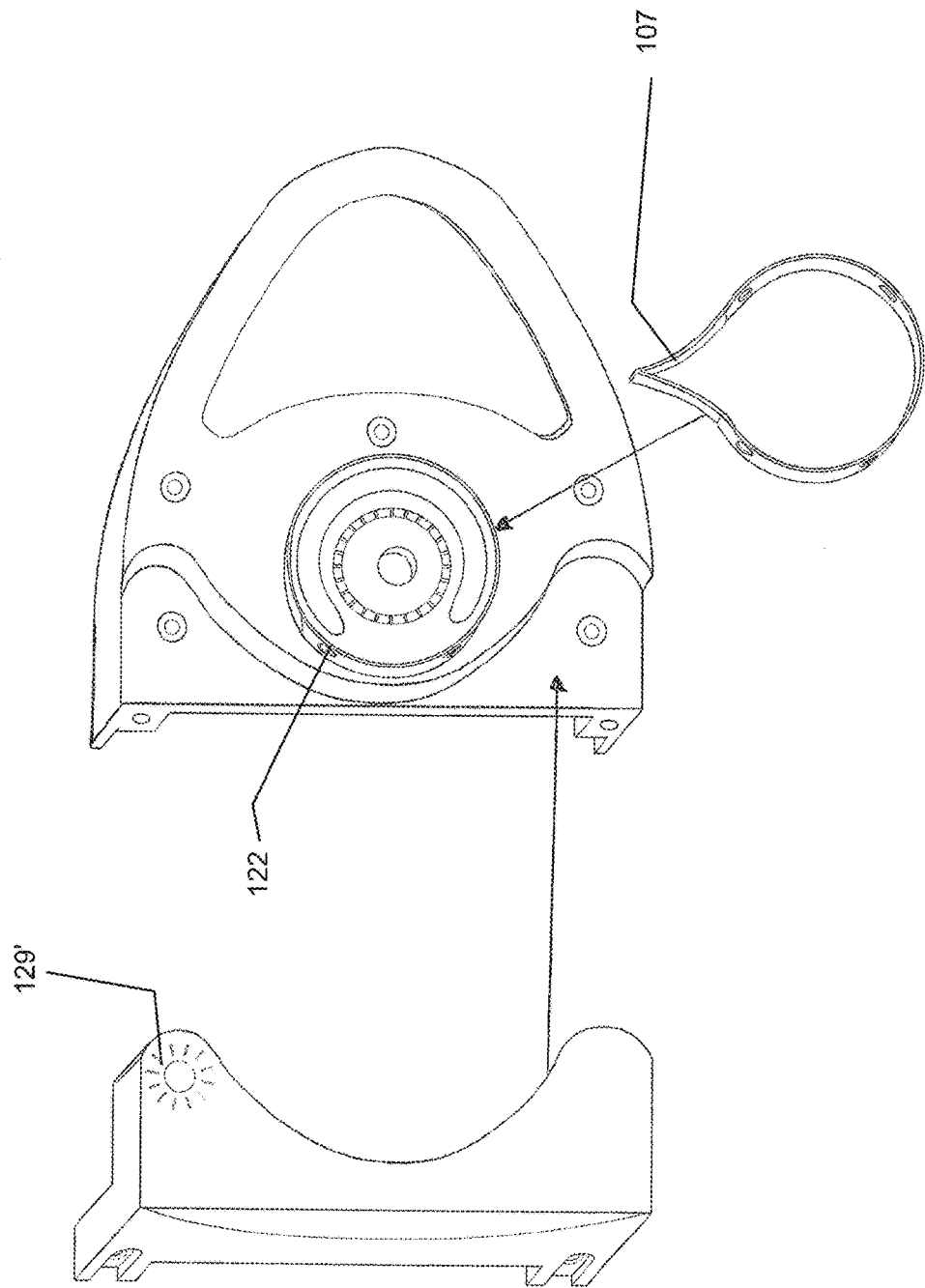
FIG. 20 is perspective view of LED LIGHT BAR WITH BRACKET according to an embodiment of the invention.
Figure 21:
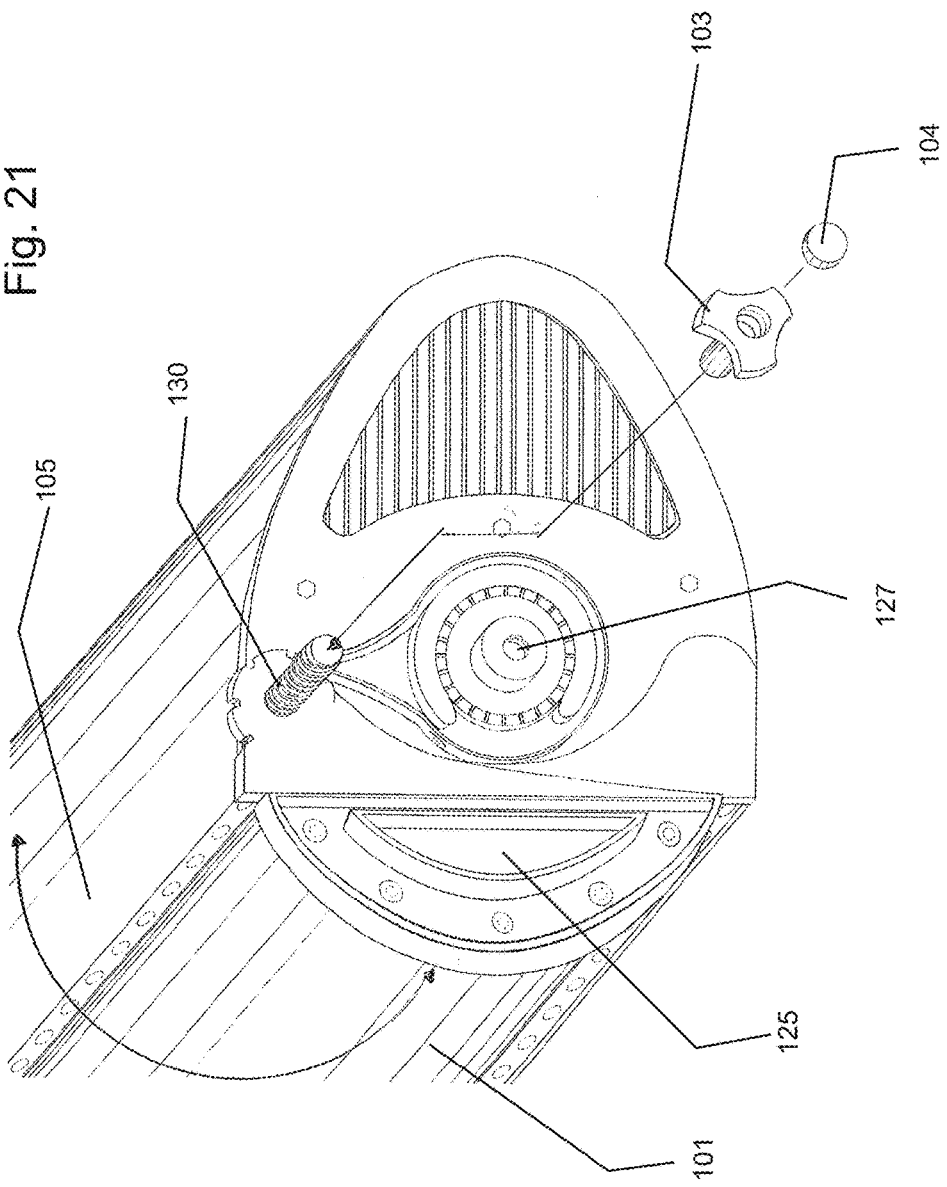
FIG. 21 is a perspective view of LED LIGHT BAR WITH COVER according to an embodiment of the invention.
Figure 22:
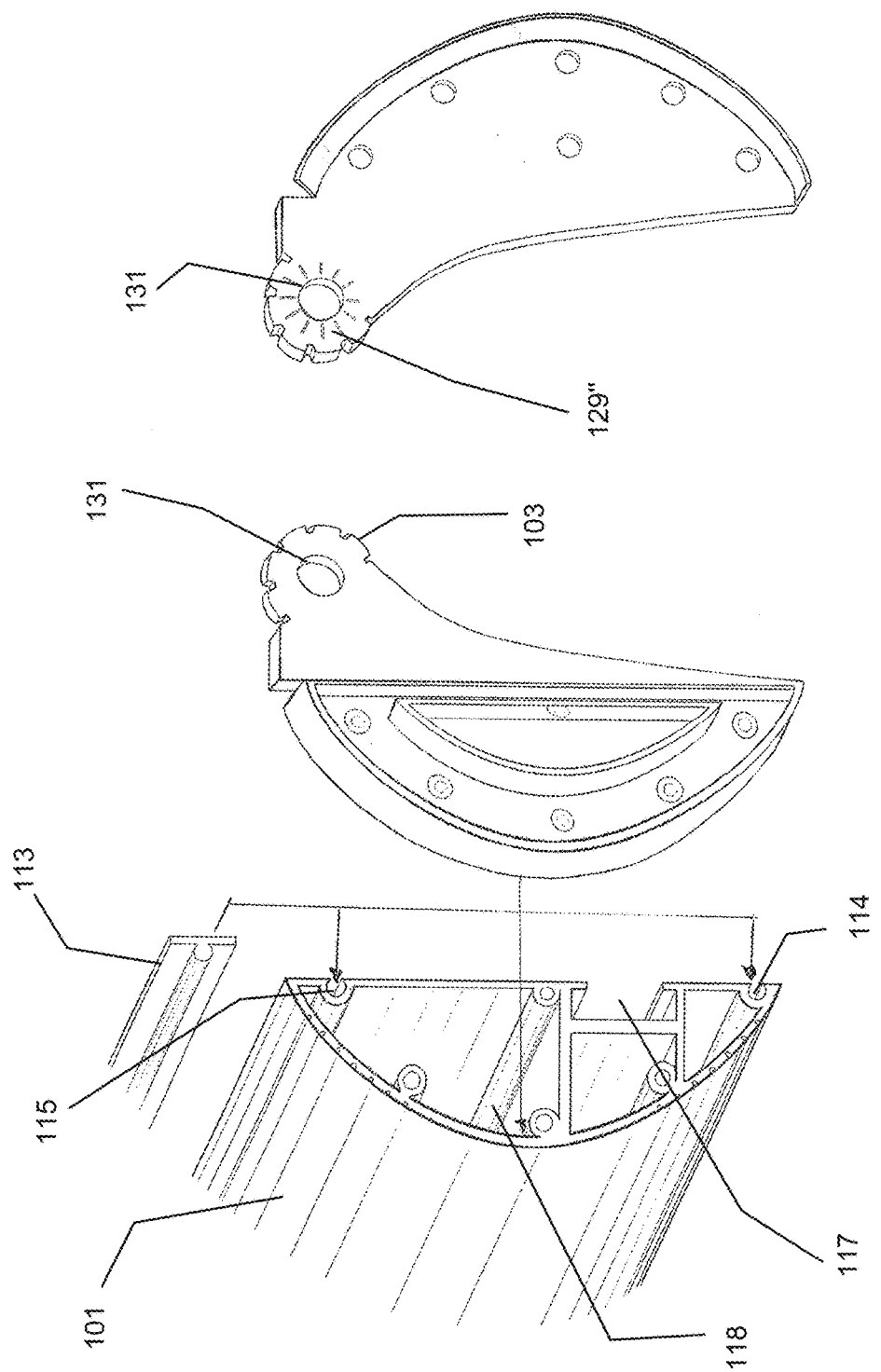
FIG. 22 is a perspective view of COVER OF LED LIGHT BAR COVER WITH BRACKET according to an embodiment of the invention.
Figure 23:
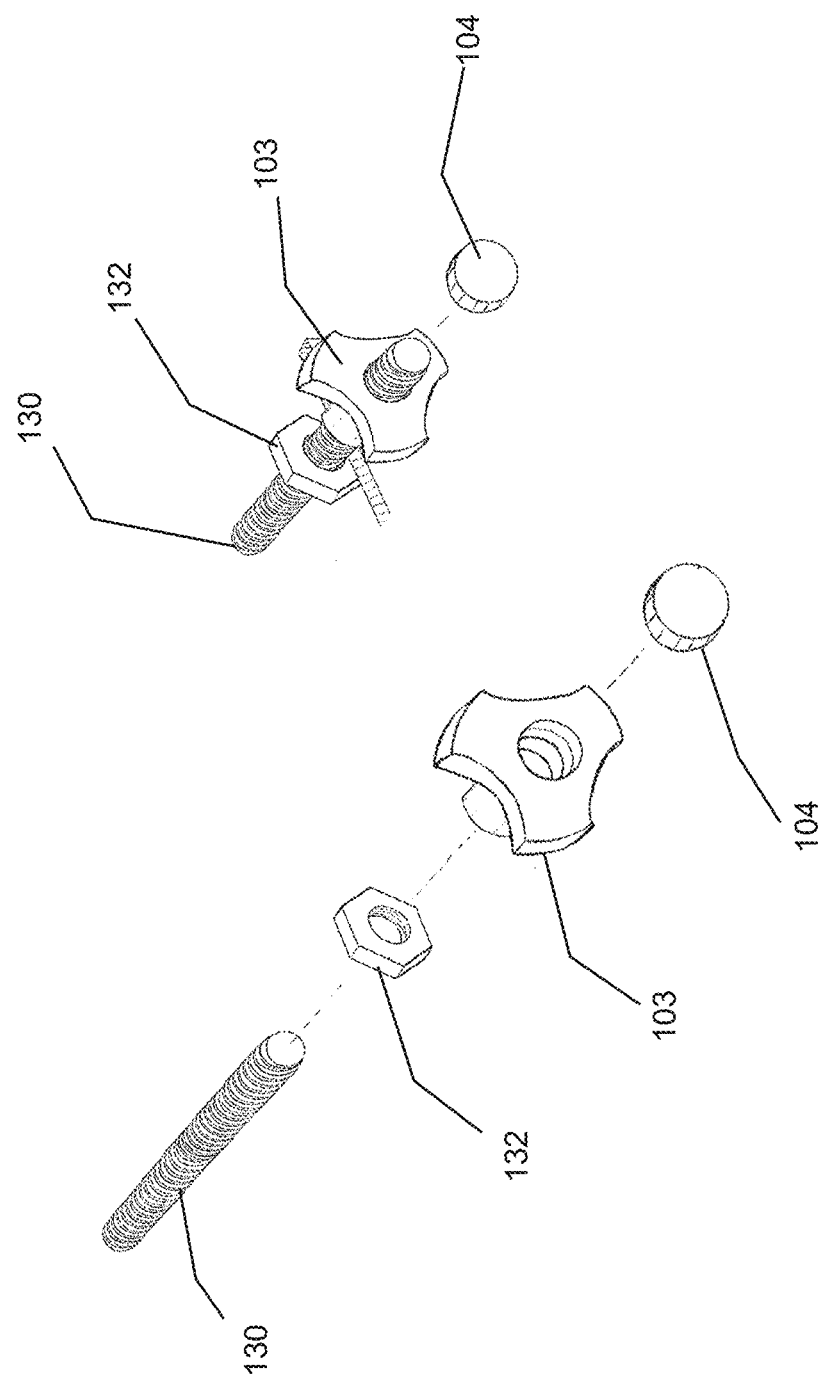
FIG. 23 is a perspective view of friction hinge knob for LED light bar cover according to an embodiment of the invention thereof.

The cover (101) has a closing surface portion and a rear surface portion and is connected to the LED light bar body (108) through hinges at the two side portions and configured for closing and opening the plurality of first LED lights (112) on the front portion, and the cover (101) has at least two stable deploying positions including a closing position and an opening position as shown in FIGS. 11, 14, and 15.

The light shut-off switch (110) is provided on the first portion of the LED light bar body (108) and configured for turning off the plurality of first LED lights (112) while the cover (101) is in the closing position.

At least some of the plurality of first LED lights (112) may comprise LED spot lights, beams of which being directed substantially horizontally.

The LED light bar (100) may further comprise a plurality of second LED lights (111) disposed on the closing surface portion of the cover (101), and the light shut-off switch (110) is further configured for turning off the plurality of second LED lights (111) while the cover (101) is in the closing position.

The plurality of second LED lights (111) may comprise LED flood lights.

The beams from the plurality of second LED lights (112) may be directed obliquely and forwards when the cover (101) is in the opening position.

The light shut-off switch (110) may be configured to be pushed by the closing surface portion of the cover (101) and turns off the plurality of first and second LED lights (111, 112).

The cover (101) may further comprise two hinge arms extending from the two side portions of the cover (101).

The LED light bar (100) may further comprise a solar panel (105) installed on the top portion of the LED light bar body (108) and be configured for supplying a back-up power to the plurality of first and second LED lights (111, 112).

The LED light bar (100) may further comprise a back-up battery (120) configured for being charged with the back-up power from the solar panel (105).

The back-up battery (120) may be installed in the cover (101). Of course, the back-up battery (120) may be installed in some locations other than the cover (101) such as the LED light bar body (108) or even an external object attached to the vehicle (900).

The plurality of first LED lights (112) and the plurality of second LED lights (111) may be controlled to turn on independently from each other.

The light shut-off switch (110) may protrude from the front portion of the LED light bar body (108) and be configured to be pushed and turned off by the cover (101) when the cover (101) is closed.

The LED light bar (100) may further comprising a right-side handle hole (125) provided on the right side portion of the cover (101) and a left-side handle hole (125) provided on the left side portion of the cover (101). Each of the right-side and left-side handle holes (125) may be configured to grab by a user's hand and open or close the cover (101).

Figure 9:
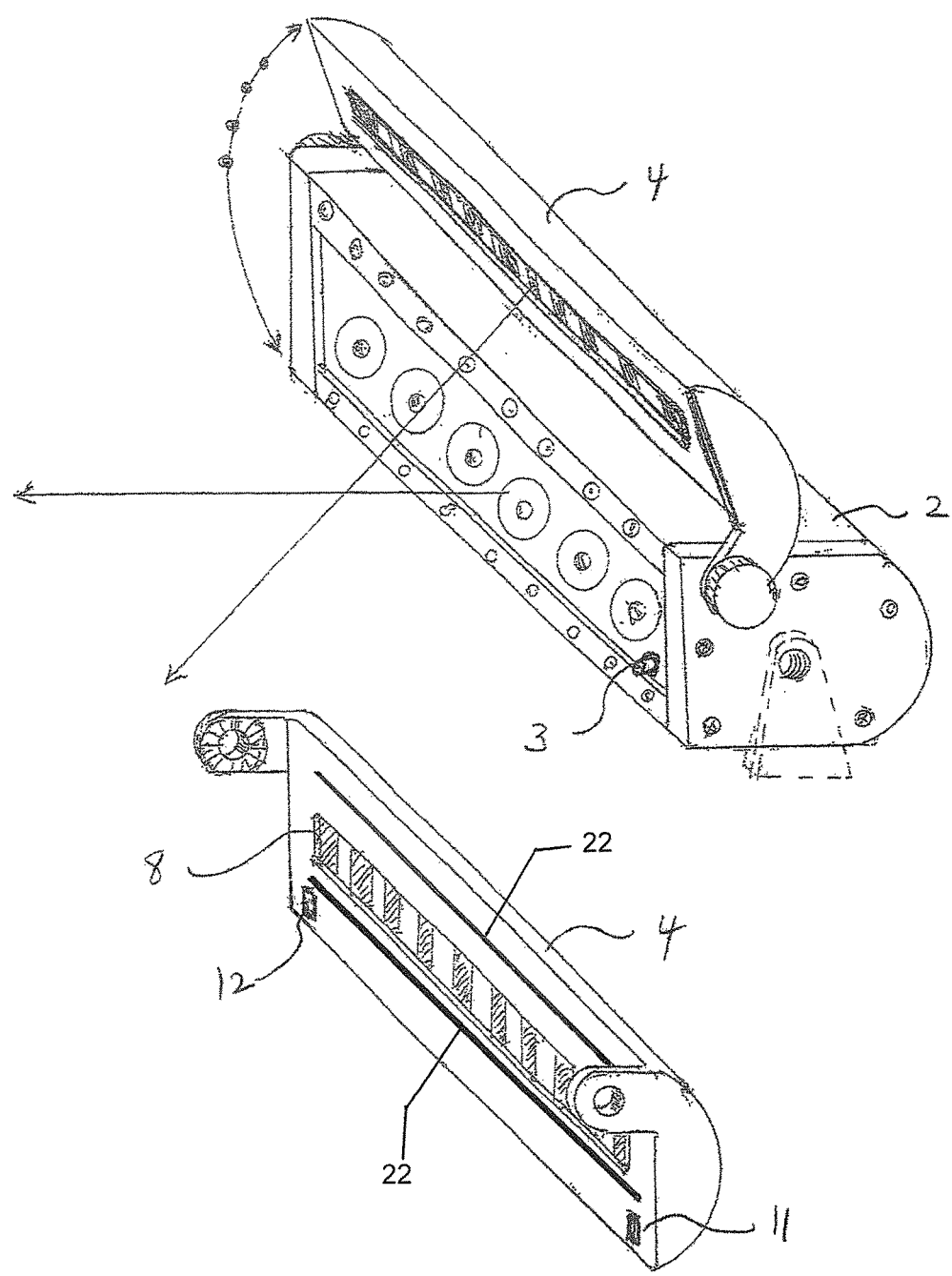
FIG. 9 is a perspective view of shut off switch with LED light bar cover with solar charged port access and switch according to still another embodiment of the invention.
Figure 10:
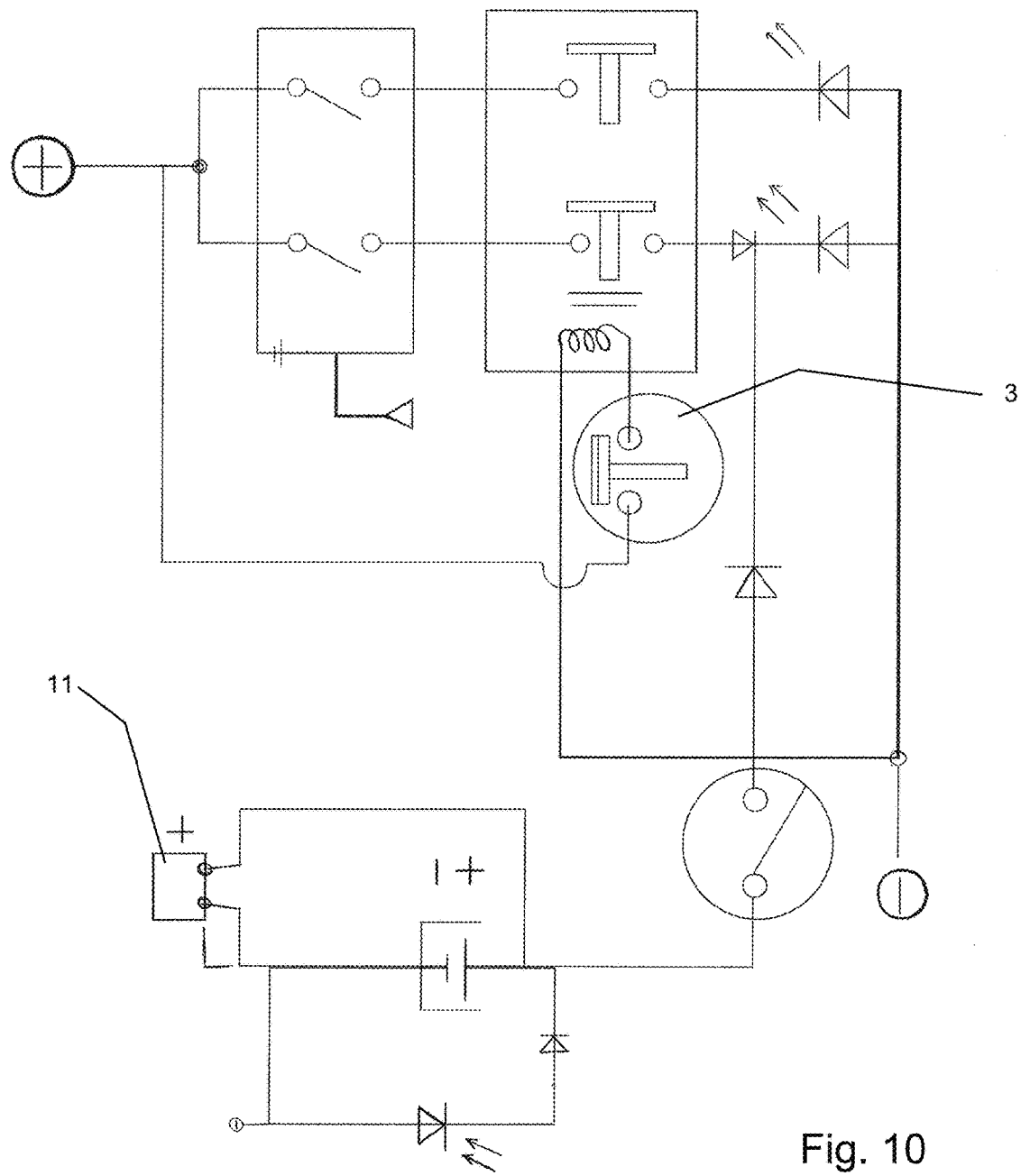
FIG. 10 is a plan line view of shut off button diagram according to an embodiment of the invention.

As shown in FIG. 9, the LED light bar (100) may further comprise one or more rubber pads (22) that are installed on the closing surface portion of the cover (4) around the plurality of second LED lights (8) and configured for blocking dust from outside and damping rattling and bumping of the cover (4).

Alternatively, the LED light bar (100) may further comprising one or more rubber pads (not shown, but just like 22) that are installed on the front portion of the LED light bar body (2) around the plurality of first LED lights (7) and configured for blocking dust from outside and damping rattling and bumping of the cover (4).

When only flood light is turned on used, which will significantly reduces the consumption of energy and can be used for long time.

Bottom light is spot led light that will be used for hunting or other activities where spot light is needed.

Thus, the lights can be used in three different options.

1. The top part is flood LED light that is mainly used for working or camping in long time use. It is used for close range activities.

2. The spot light for far spot light (bottom spot led) for hunting and other farther distance, focused light.

3. Both lights (top and bottom) on for both far and surrounding areas. When both top flood light and bottom spot lights are turned on, it will be very bright and brightens the whole surrounding areas.

4. Thus it can be used in 3 different options:

A. only top flood light can be turned on for close range use.

B. Only spot lights can be turned on for farther focused distance use.

C. Both lights on for more brighter use.

Our designed LED light bar can be legally used in both local or highway by fully covering the LED lights.

Still another advantage of the product is it will reduce the noise of the wind and reduce the air resistance by providing the cover that is aerodynamic front cover shaped design.

The other parts can be figured out by the Drawings and the reference numerals presented below.

For an example, the USB connecting port (116) can be used to charge the battery (120) or tap the power stored in the battery (120).

Figure 5:
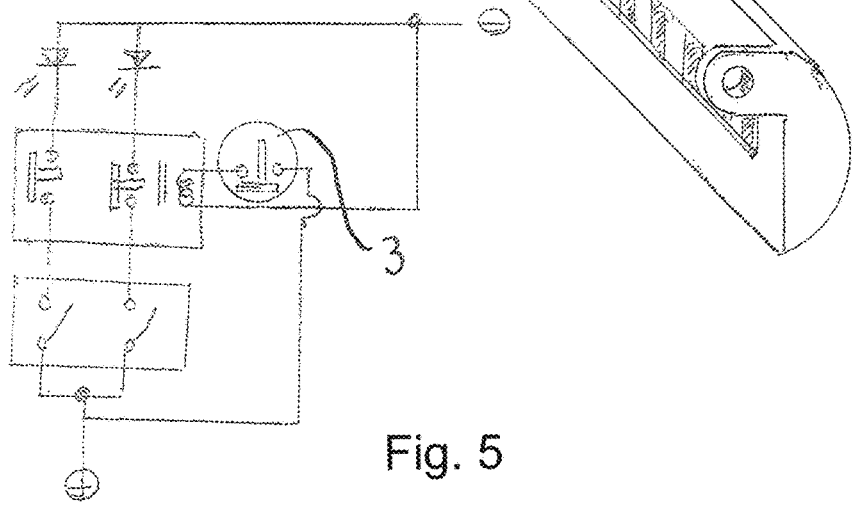
FIG. 5 is a plan line view of shut off button diagram according to an embodiment of the invention.
Figure 6:
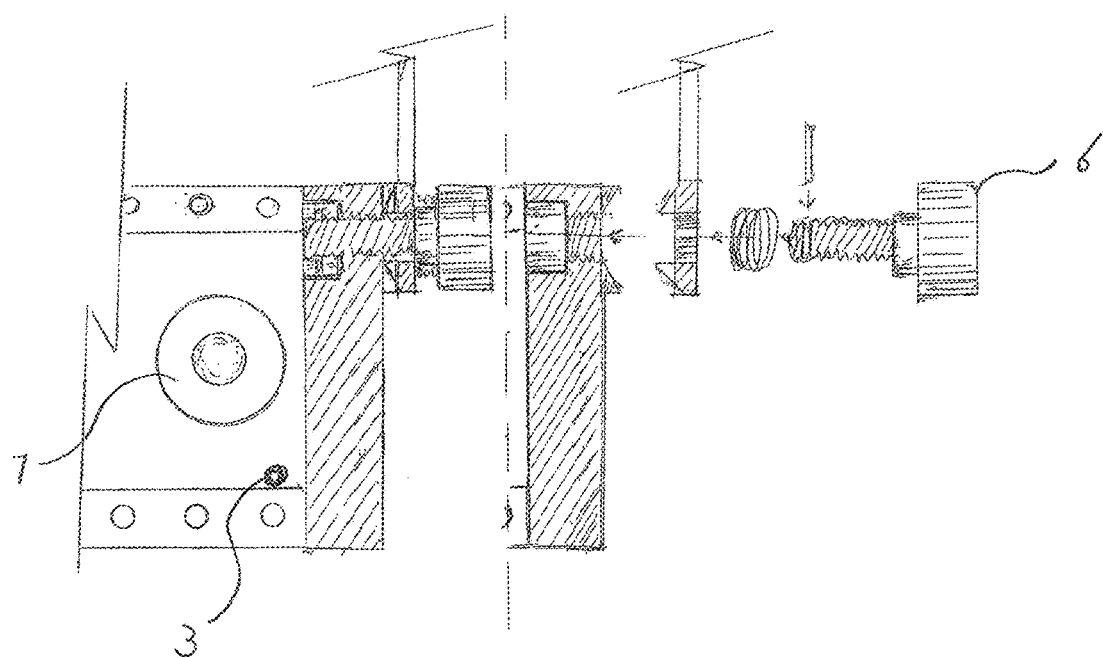
FIG. 6 is a cross-sectional view of a shut off switch with an LED light bar according to an embodiment of the invention.
Figure 7:
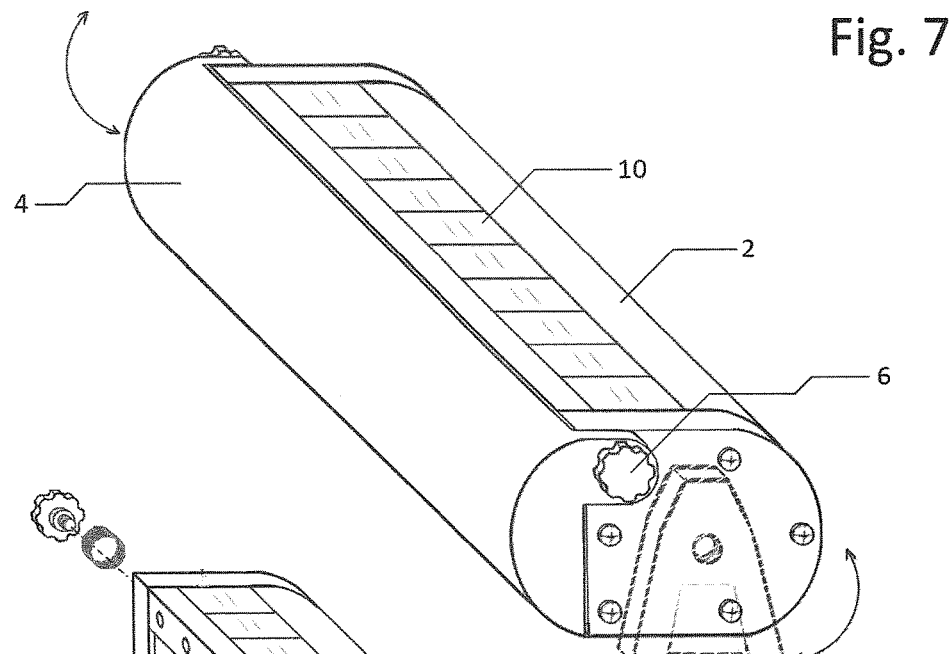
FIG. 7 is a perspective view of assembled LED light light bar cover with solar panel and charger for flood light according to an embodiment of the invention.
Figure 8:
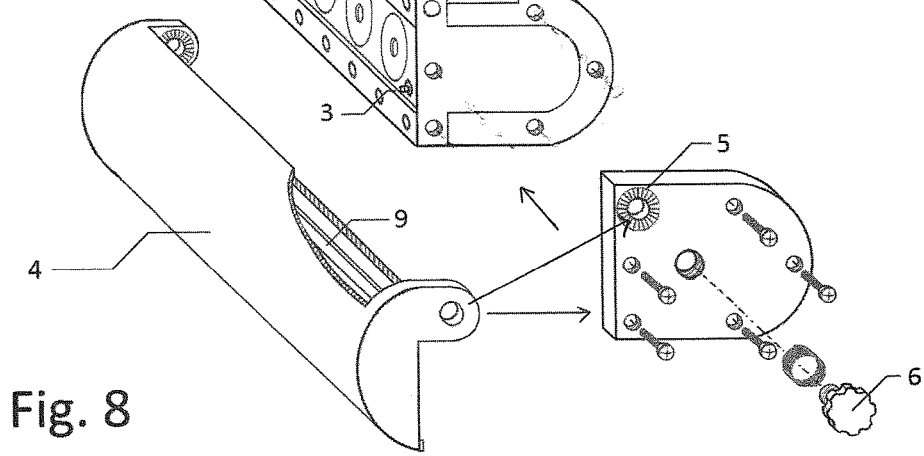
FIG. 8 is a perspective view of exploded LED light bar cover with solar panel and battery for flood light according to another embodiment of the invention.

FIGS. 5 and 11 show examples of a light shut-off switch and associated circuits, which are not limiting of course. Any type of switch can be adopted as long as it can make the LED lights turned off at the time or when the cover is closed.

Figure 24:
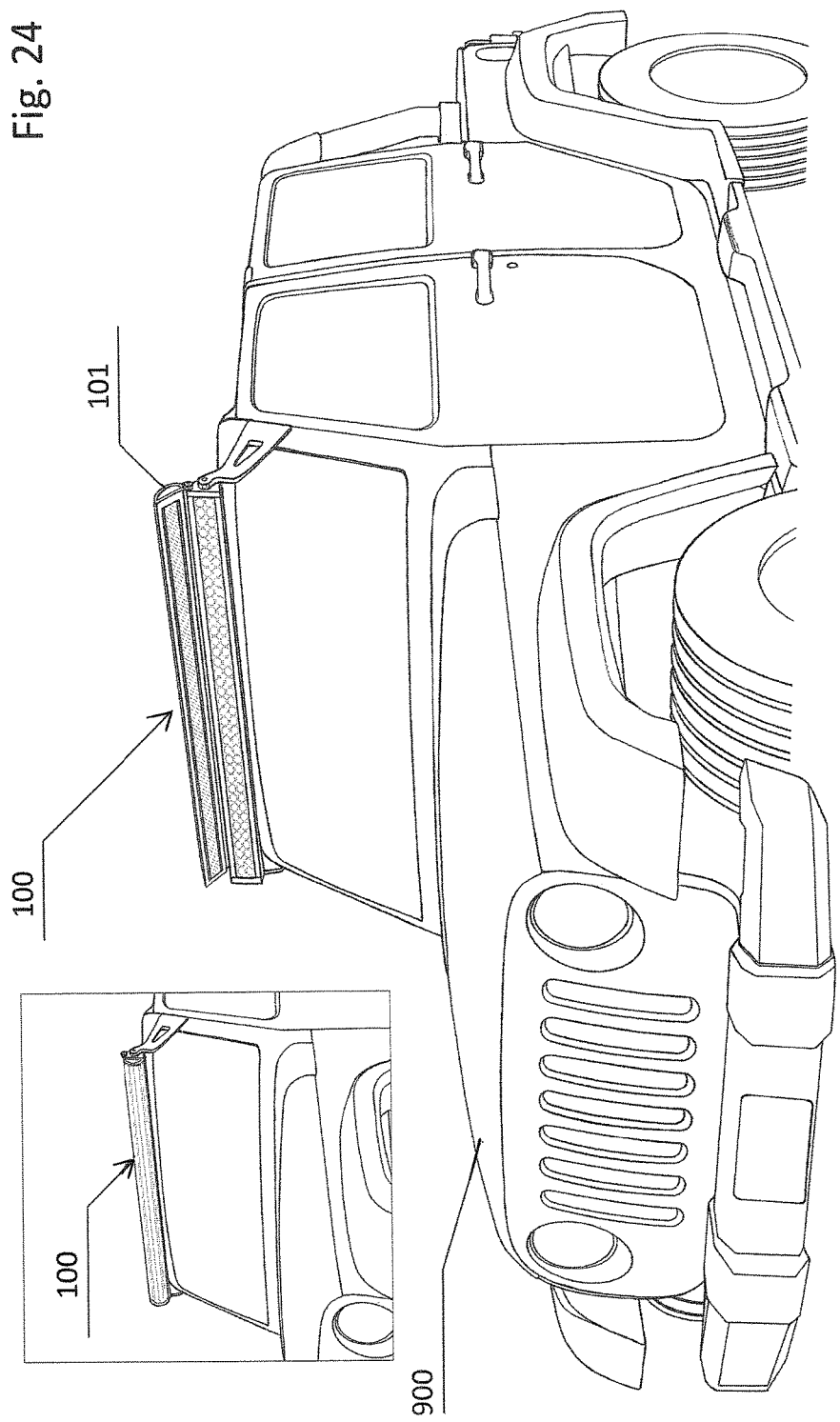
FIG. 24 is a picture showing an LED light bar in opening/closing positions according to still another embodiment of the invention.
Figure 25:
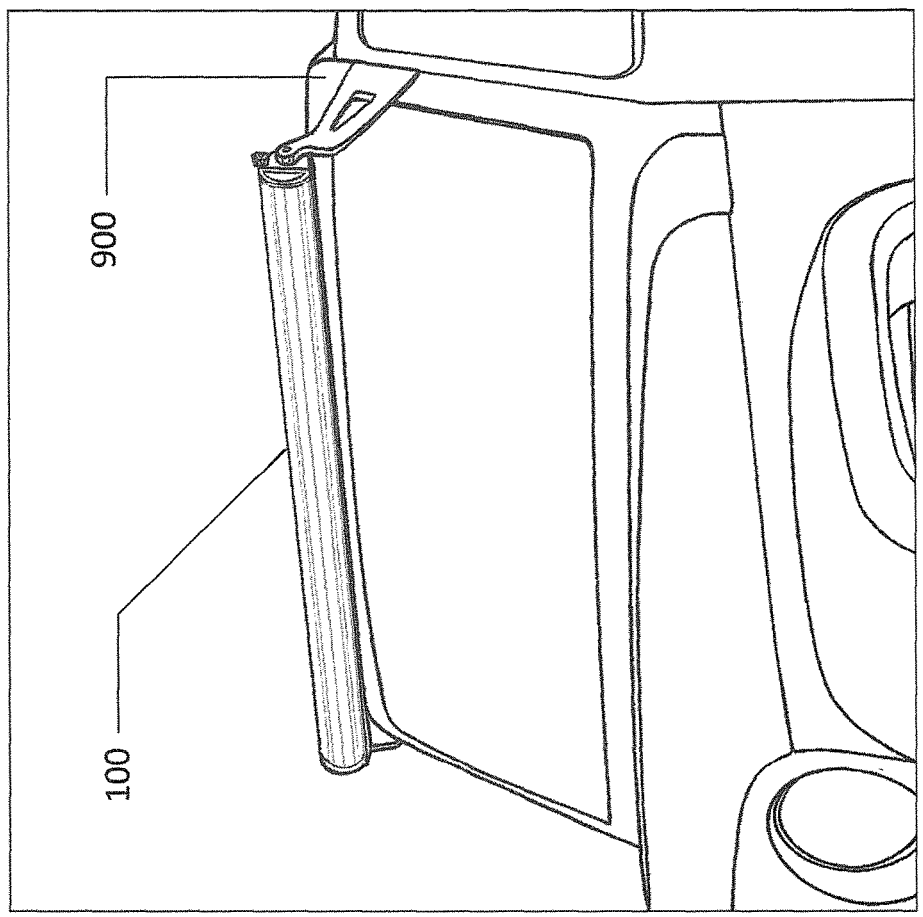
FIG. 25 is another picture showing an enlarged LED light bar of FIG. 24 in the closing position.

FIGS. 24 and 25 show an LED light bar in opening/closing positions installed in a vehicle (900) according to still another embodiment of the invention.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCE NUMERALS

| | |
|---|---|
| 101 | LED light bar cover |
| 102 | Side bracket for cover of LED light bar cover |
| 103' | Tightening Kob |
| 103" | Dummy knob |
| 104 | Fixed Cap for knob |
| 105 | Solar Panel |
| 106 | Step teeth gear |
| 107 | Step spring |
| 108 | LED light bar main body |
| 109 | Side bracket for LED light bar main body |
| 110 | Auto shut off light switch (when cover is closed) |
| 111 | LED flood light |
| 112 | LED spot light |
| 113 | Shock absorbing and dust blocking rubber |
| 114 | Screw mounting hole |
| 115 | Screw mounting hole |
| 116 | USB connecting port |
| 117 | LED flood light insert hole |
| 118 | Battery insert hole |
| 119 | LED flood light |
| 120 | Rechargeable battery |
| 121 | Step Spring home |
| 122 | Screw hole |
| 123 | Screw hole |
| 124 | Screw for mounting |
| 125 | Cover grabbing space |
| 126 | Screw |
| 127 | Mounting screw for LED Light bar |
| 128 | Screw mounting hole (for fastening with side bracket) |
| 129' | Friction on side bracket (LED light bar) |
| 129" | Friction step on inside of cover bracket |
| 130 | Knob screw |
| 131 | Knob Screw hole |
| 132 | Bolt |

What is claimed is:

1. An LED light bar comprising:
an LED light bar body having a front portion, a top portion, a bottom portion, a rear portion, and two side portions, wherein a plurality of first LED lights are disposed on the front portion;
a cover having a closing surface portion and a rear surface portion and connected to the LED light bar body through hinges at the two side portions and configured for closing and opening the plurality of first LED lights on the front portion, wherein the cover has at least two stable deploying positions including a closing position and an opening position; and
a light shut-off switch provided on the front portion of the LED light bar body and configured for turning off the plurality of first LED lights while the cover is in the closing position.

2. The LED light bar of claim 1, wherein at least some of the plurality of first LED lights comprise LED spot lights, beams of which being directed substantially horizontally.

3. The LED light bar of claim 2, further comprising a plurality of second LED lights disposed on the closing surface portion of the cover, wherein the light shut-off switch is further configured for turning off the plurality of second LED lights while the cover is in the closing position.

4. The LED light bar of claim 3, wherein the plurality of second LED lights comprise LED flood lights.

5. The LED light bar of claim 4, wherein beams from the plurality of second LED lights are directed obliquely and forwards when the cover is in the opening position.

6. The LED light bar of claim 3, wherein the light shut-off switch is configured to be pushed by the closing surface portion of the cover and turns off the plurality of first and second LED lights.

7. The LED light bar of claim 1, wherein the cover further comprises two hinge arms extending from the two side portions of the cover.

8. The LED light bar of claim 3, further comprising a solar panel installed on the top portion of the LED light bar body and configured for supplying a back-up power to the plurality of first and second LED lights.

9. The LED light bar of claim 8, further comprising a back-up battery configured for being charged with the back-up power from the solar panel.

10. The LED light bar of claim 9, wherein the back-up battery is installed in the cover.

11. The LED light bar of claim 3, wherein the plurality of first LED lights and the plurality of second LED lights are controlled to turn on independently from each other.

12. The LED light bar of claim 1, wherein the light shut-off switch protrudes from the front portion of the LED light bar body and is configured to be pushed and turned off by the cover when the cover is closed.

13. The LED light bar of claim 1, further comprising:
a right-side handle hole provided on the right side portion of the cover; and
a left-side handle hole provided on the left side portion of the cover,
wherein each of the right-side and left-side handle holes is configured to grab by a user's hand and open or close the cover.

14. The LED light bar of claim 3, further comprising one or more rubber pads that are installed on the closing surface portion of the cover around the plurality of second LED lights and configured for blocking dust from outside and damping rattling and bumping of the cover.

15. The LED light bar of claim 1, further comprising one or more rubber pads that are installed on the front portion of the LED light bar body around the plurality of first LED lights and configured for blocking dust from outside and damping rattling and bumping of the cover.

* * * * *